United States Patent
Kim

(10) Patent No.: US 12,483,764 B2
(45) Date of Patent: Nov. 25, 2025

(54) DISPLAY DEVICE AND OPERATING METHOD THEREFOR

(71) Applicant: LG ELECTRONICS INC., Seoul (KR)

(72) Inventor: Hyunseung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 18/033,193

(22) PCT Filed: Oct. 22, 2020

(86) PCT No.: PCT/KR2020/014496
§ 371 (c)(1),
(2) Date: Apr. 21, 2023

(87) PCT Pub. No.: WO2022/085820
PCT Pub. Date: Apr. 28, 2022

(65) Prior Publication Data
US 2023/0370697 A1    Nov. 16, 2023

(51) Int. Cl.
*H04N 21/858*    (2011.01)
*H04N 21/41*    (2011.01)
(Continued)

(52) U.S. Cl.
CPC ..... *H04N 21/8586* (2013.01); *H04N 21/4126* (2013.01); *H04N 21/436* (2013.01); *H04N 21/4782* (2013.01)

(58) Field of Classification Search
CPC ........... H04N 21/8586; H04N 21/4126; H04N 21/436; H04N 21/4782; H04N 21/4108;
(Continued)

(56) References Cited

U.S. PATENT DOCUMENTS 9,117,004 B2 *   8/2015   Kuo ........................ G06F 8/38
10,402,146 B2    9/2019   Oh et al.
(Continued)

FOREIGN PATENT DOCUMENTS

KR    1020150025514    3/2015
KR    1020150065367    6/2015
(Continued)

OTHER PUBLICATIONS

European Patent Office Application Serial No. 20958771.6, Search Report dated Feb. 27, 2024, 4 pages.
(Continued)

*Primary Examiner* — Oschta I Montoya
(74) *Attorney, Agent, or Firm* — LEE, HONG, DEGERMAN, KANG & WAIMEY

(57) ABSTRACT

A display device according to an embodiment of the present disclosure may comprise: a wireless communication unit configured to communicate with an external device, wirelessly; a display unit; and a control unit configured to display, on the display unit, a web page including a video play area through a web browser, determine whether a video can be played in the video play area, and if it is determined that the video cannot be played, transmit a URL (Uniform Resource Locator) of the web page to the external device through the wireless communication unit.

15 Claims, 17 Drawing Sheets

(51) Int. Cl.
*H04N 21/436* (2011.01)
*H04N 21/4782* (2011.01)

(58) Field of Classification Search
CPC ......... H04N 21/4122; H04N 21/43076; H04N 21/431; H04N 21/43615; H04N 21/43637; H04N 21/442; H04N 21/858
See application file for complete search history.

(56) References Cited

U.S. PATENT DOCUMENTS

| | | | |
|---|---|---|---|
| 11,019,124 B2 | 5/2021 | Han et al. | |
| 2013/0219072 A1* | 8/2013 | Han | H04L 67/131 709/227 |
| 2015/0067748 A1* | 3/2015 | Kang | H04N 21/4516 725/110 |
| 2015/0161283 A1* | 6/2015 | Han | G06F 3/0482 715/201 |

FOREIGN PATENT DOCUMENTS

| | | |
|---|---|---|
| KR | 101918040 | 1/2019 |
| KR | 1020200079026 | 7/2020 |

OTHER PUBLICATIONS

PCT International Application No. PCT/KR2020/014496, International Search Report dated Jul. 9, 2021, 4 pages.

\* cited by examiner

DISPLAY DEVICE AND OPERATING METHOD THEREFOR

CROSS-REFERENCE TO RELATED APPLICATIONS

This application is the National Stage filing under 35 U.S.C. 371 of International Application No. PCT/KR2020/014496, filed on Oct. 22, 2020, the contents of which are all incorporated by reference herein in their entirety.

TECHNICAL FIELD

The present invention relates to a display device.

BACKGROUND ART

Digital TV services using wired or wireless communication networks are becoming common. Digital TV services are capable of providing various services that could not be provided by the existing analog broadcasting services.

For example, IPTV (Internet Protocol Television) service, which is a type of digital TV service, and smart TV service provide bidirectionality that allows users to actively select the type of program to watch and the viewing time. IPTV and smart TV services may provide various additional services, such as Internet search, home shopping, and online games, based on this interactive nature.

That is, a recent TV can play a video through a web browser.

However, if the video cannot be played according to the policy of each website, the user has to search for the video using a PC or mobile device, which is inconvenient.

In addition, if an error occurs due to a network error when attempting to access the content provider server through the TV, the user has to use a PC or mobile device to re-attempt to access the content provider server, which is inconvenient.

DISCLOSURE

Technical Problem

An object of the present disclosure is to provide a display device that enables viewing of unavailable moving image through a web browser of a TV.

An object of the present disclosure is to provide a display device capable of using a content provider application, which was not executable through a TV, on a TV with the help of an external device.

Technical Solution

According to an embodiment of the present disclosure, a display device may display, on the display unit, a web page including a video play area through a web browser, determine whether a video can be played in the video play area, and if it is determined that the video cannot be played, transmit URL (Uniform Resource Locator) of the web page to the external device.

According to an embodiment of the present disclosure, an operating method of a display device may comprise: displaying a web page including a video play area through a web browser; determining whether a video can be played in the video play area; and transmitting a URL (Uniform Resource Locator) of the web page to an external device if it is determined that the video cannot be played

Advantageous Effects

According to various embodiments of the present disclosure, an environment in which an unviewable video can be viewed through a web browser of a TV is provided, and user convenience can be greatly improved.

According to various embodiments of the present disclosure, a user's convenience can be greatly improved by providing a connection with an unconnectable content provider through a TV.

BEST MODE

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
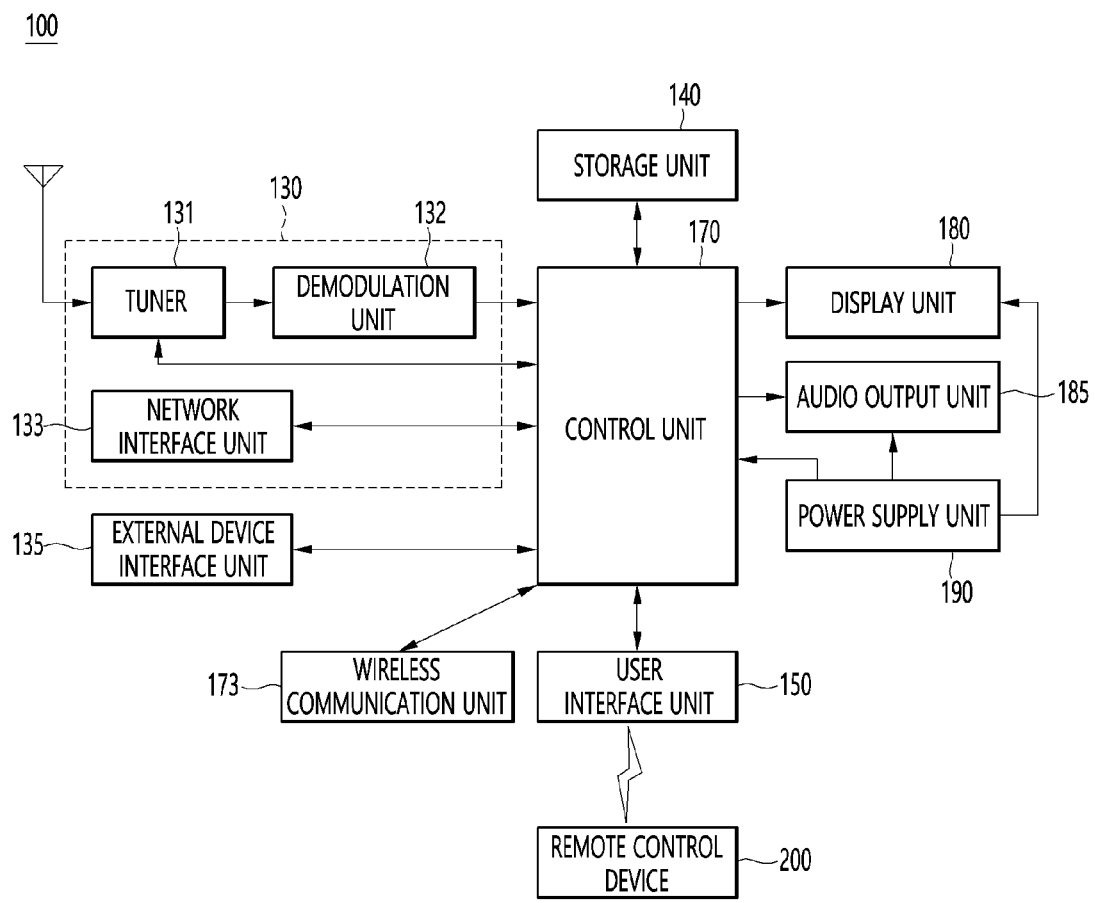
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
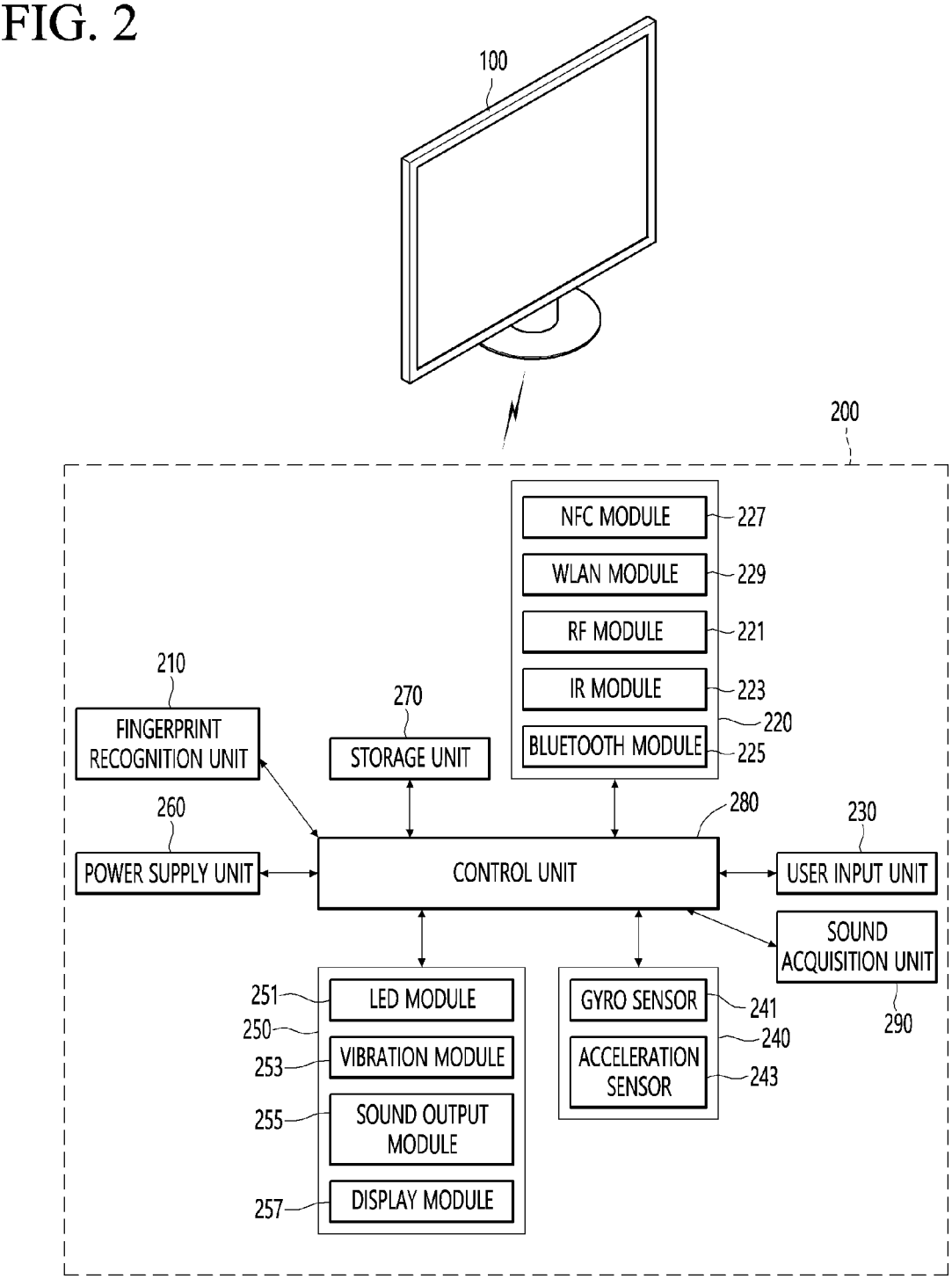
FIG. 2 is a block diagram illustrating a remote control device according to an embodiment of the present invention.
Figure 3:
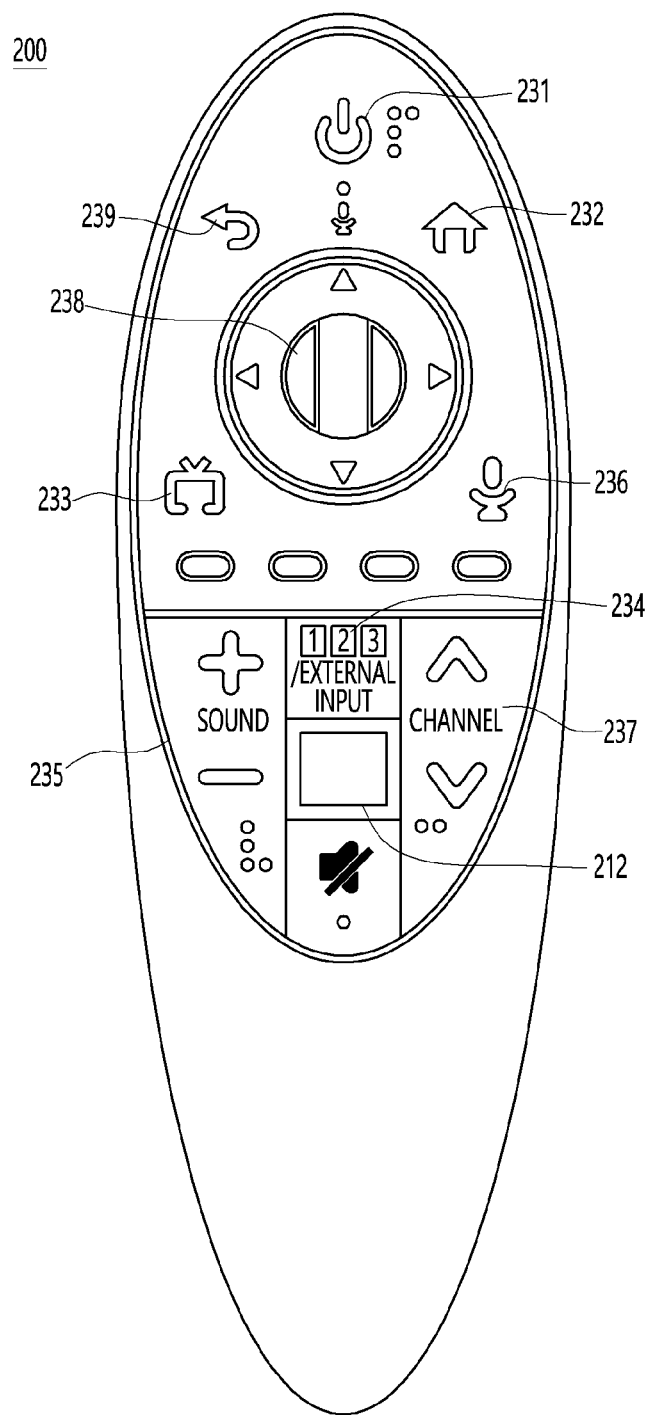
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice. The sound acquisition unit 290 can include at least one microphone and obtain voice through the microphone 291.

Figure 4:
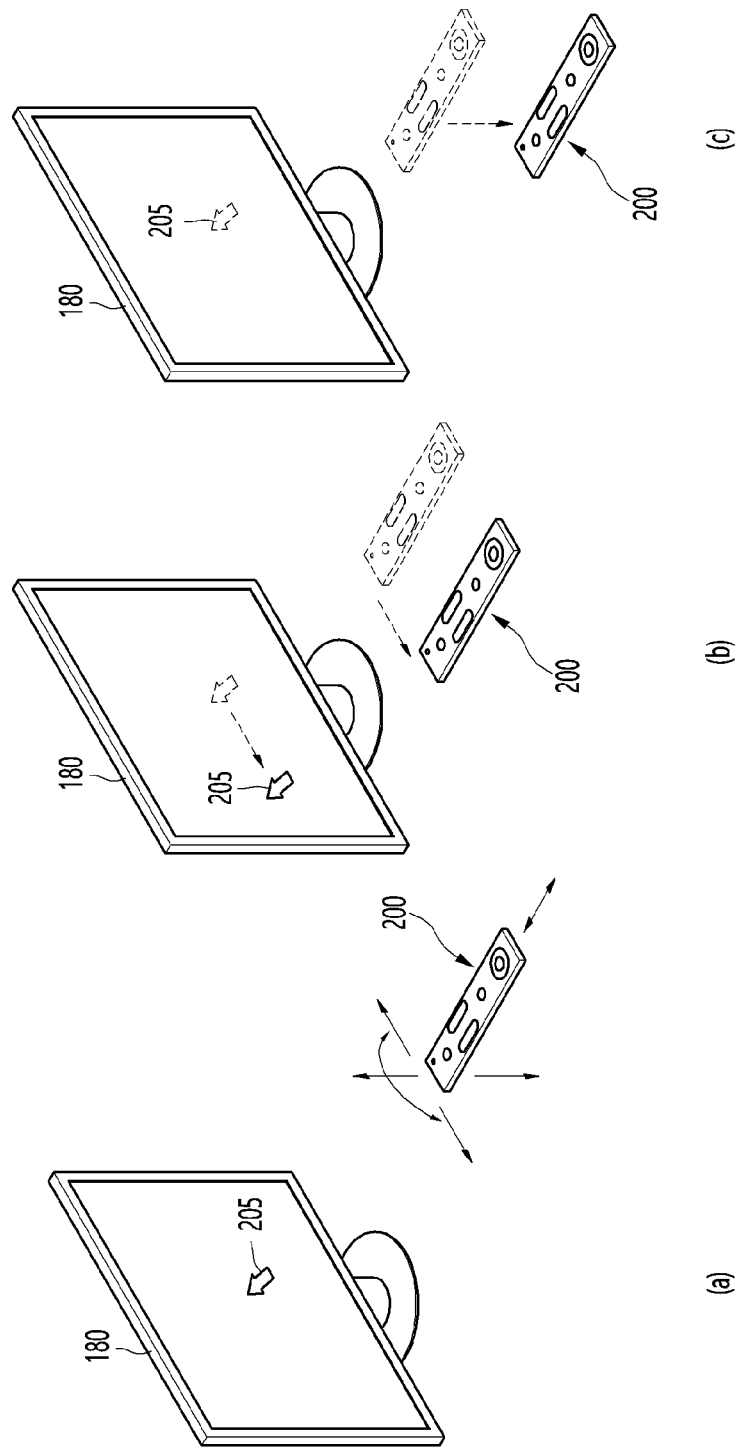
FIG. 4 is a view of utilizing a remote control device according to an embodiment of the present invention.

FIG. 4 is a view of utilizing a remote control device according to an embodiment of the present invention. FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180.

Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
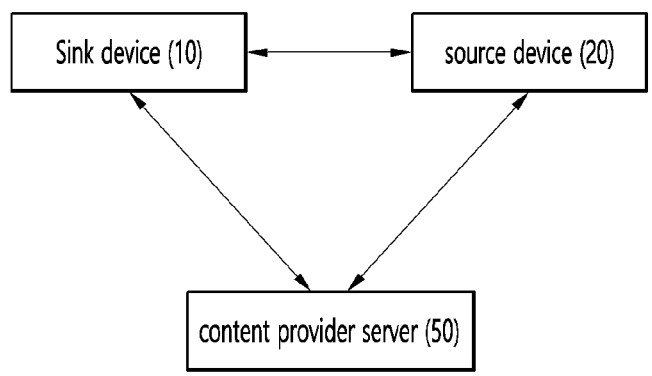
FIG. 5 is a diagram illustrating the configuration of a wireless system according to an embodiment of the present invention.

FIG. 5 is a diagram illustrating the configuration of a wireless system according to an embodiment of the present invention.

Referring to FIG. 5, a wireless system 5 may include a display device 100, a mobile terminal 500 and a content provider server 50.

The mobile terminal 500 and the display device 100 may provide a screen sharing service.

The mobile terminal 500 may transmit image data of the image being displayed to the display device 100, and the display device 100 may display the image being displayed by the mobile terminal 500 based on the received image data.

The mobile terminal 500 may be referred to as a source device in that it provides an image, and the display device 100 may be referred to as a sink device in that it receives an image.

The content provider server 50 may cast a video to the display device 100 based on a request received from the mobile terminal 500.

The content provider server 50 may stream the video to the mobile terminal 500 or the display device 100.

Figure 6:
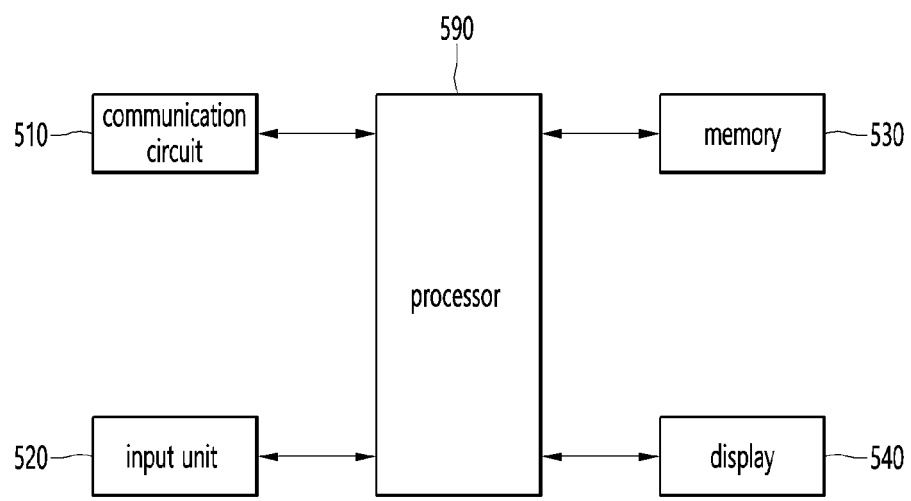
FIG. 6 is a block diagram illustrating the configuration of a mobile terminal according to an embodiment of the present invention.

FIG. 6 is a block diagram illustrating the configuration of a mobile terminal according to an embodiment of the present invention.

The mobile terminal 500 may be implemented as a fixed device or a movable device such as a projector, a mobile phone, a smart phone, a desktop computer, a laptop computer, a digital broadcast terminal, a personal digital assistant (PDA), a portable multimedia player (PMP), a navigation device, a tablet PC, a wearable device, a set-top box (STB), a DMB receiver, a radio, or a desktop computer.

Referring to FIG. 6, a mobile terminal 500 may include a communication circuit 510, an input unit 520, a memory 530, a display 540, and a processor 590.

The communication circuit 510 may transmit/receive data with external devices such as other mobile terminal or server using wired/wireless communication technology.

The communication circuit 510 may perform a communication using any one of communication standard among GSM (Global System for Mobile communication), CDMA (Code Division Multi Access), LTE (Long Term Evolution), 5G, WLAN (Wireless LAN), Wi-Fi (Wireless-Fidelity), Bluetooth, Radio Frequency Identification (RFID), Infrared Data Association (IrDA), ZigBee, and Near Field Communication (NFC).

The input unit 520 may include a camera for inputting a video signal, a microphone for receiving an audio signal, and a user input unit for receiving information from a user.

Here, a camera or microphone may be treated as a sensor, and signal obtained from the camera or microphone may be referred to as sensing data or sensor information.

The memory 530 may store various software and data related to the operation of the mobile terminal 100.

The display 540 may display an image signal received from the outside.

The processor 590 may control overall operation of the mobile terminal 100.

The processor 590 may generate a control signal for controlling the external device and transmit the generated control signal to the external device if a link is needed with external device to perform the operation of the mobile terminal 500.

The processor 590 may obtain intention information for a user input and determine a user's requirement based on the obtained intention information.

The processor 590 may control at least some of the elements of the mobile terminal 100 in order to drive an application program stored in the memory 170.

The processor 590 may combine and operate two or more of the elements included in the mobile terminal 100 to drive the application program.

Next, referring to FIG. 7, an operating method of a system according to an embodiment of the present invention will be described.

Figure 7:
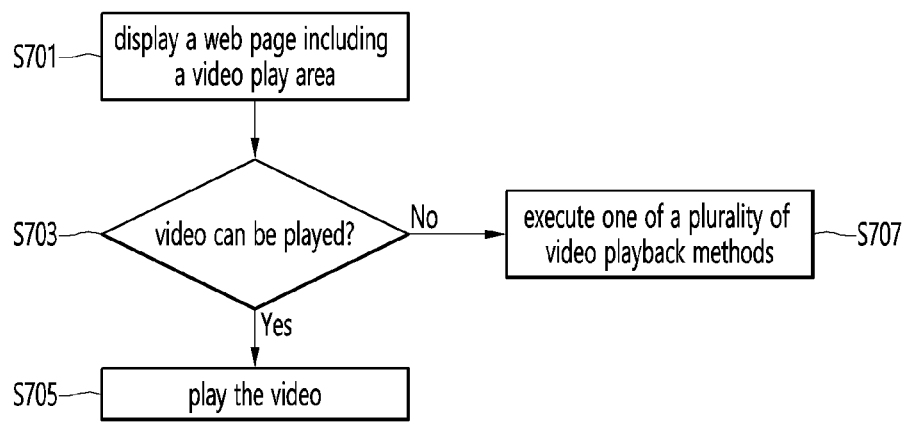
FIG. 7 is a ladder diagram for a method of operating a system according to an embodiment of the present invention.

FIG. 7 is a flowchart illustrating an operation method of a display device according to an embodiment of the present invention.

Referring to FIG. 7, the control unit 170 of the display device 100 displays a web page including a video play area on the display unit 180 (S701).

The control unit 170 may display a web page on the display unit 180 using a URL through a web browser. The web page may include a video play area, which is an area where a video may be played.

On the video play area, if the video cannot be played due to policy, text indicating that the video cannot be played may be displayed.

The control unit 170 determines whether or not a video can be played on the video play area of the web page (S703).

In an embodiment, the control unit 170 may recognize text output in the video play area and determine whether the video can be played.

For example, the control unit 170 may recognize text using a Hyper Text Markup Language (HTML) document of a web page. The control unit 170 may obtain an HTML document corresponding to the web page, extract a video play area from within the HTML document, and identify text included in the extracted video play area.

In another embodiment, the control unit 170 may recognize text using an optical character recognition (OCR) technique.

The control unit 170 may determine that the video cannot be played if the text includes a meaning indicating that the video cannot be played.

Figure 8:
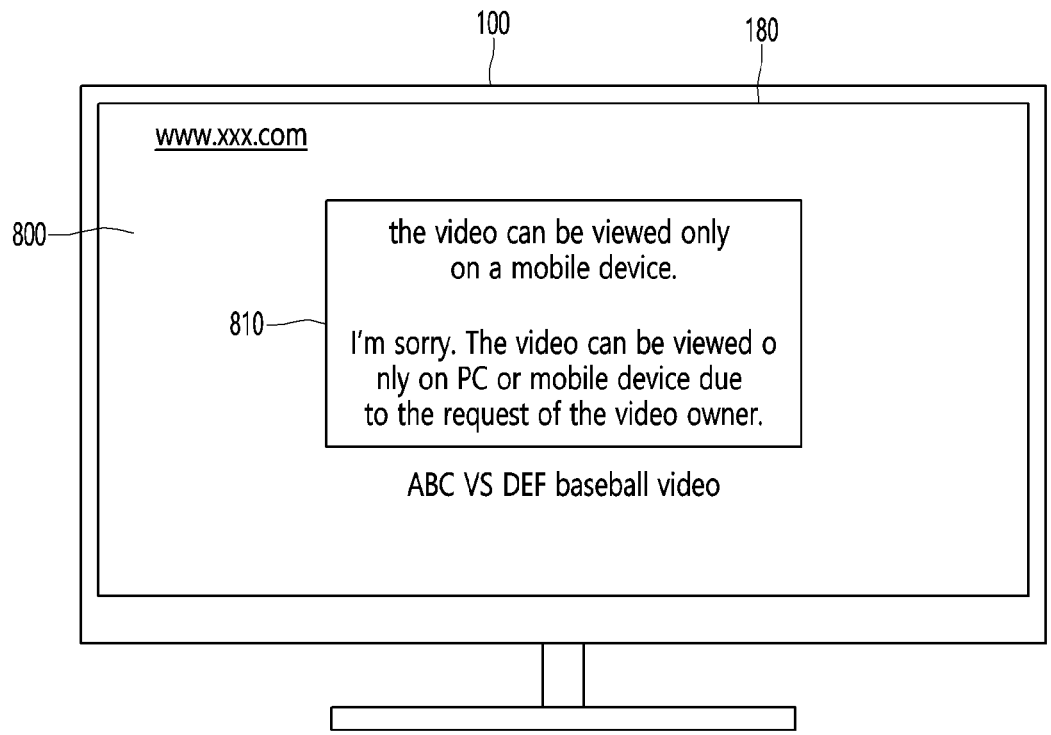
FIG. 8 is a diagram for illustrating text included in a video playback area of a web page.

FIG. 8 is a diagram for illustrating text included in a video playback area of a web page.

Referring to FIG. 8, the display device 100 shows a web page 800 according to the execution of a web browser. The URL of the web page 800 is <www.xxx.com>.

The web page 800 may include a video play area 810 capable of playing a video.

If the video cannot be played due to policy or at the request of the video owner, text indicating that the video cannot be played and that the video can be played only on a PC or mobile device may be displayed on the video play area 810.

The control unit 170 may recognize text included in the video play area 810 and determine whether or not the video can be played according to the recognition result.

Again, FIG. 7 will be described.

In another embodiment, the control unit 170 may determine whether a video can be played based on an HTML event. This will be described later.

If it is determined that the video can be played, the control unit 170 plays the video (S705), and when it is determined that the video cannot be played, it executes one of a plurality of video playback methods (S707).

In one embodiment, the video playback method may be a method of transmitting the URL of the web page 800 to an external device connected to the display device 100 and playing the video through the external device.

In another embodiment, the video playback method may be a method of playing a video by performing a mirroring function with an external device connected to the display device 100.

In another embodiment, the video playback method may be a method of searching for the name of an unplayable video and playing the video using the search result.

Hereinafter, if it is impossible to play a video on the web page 800 of the display device 100, various methods for viewing a video will be described.

Hereinafter, the external device connected to the display device 100 is described assuming the mobile terminal 500 of FIG. 5, but is not limited thereto and may be a PC or a laptop computer.

Figure 9:
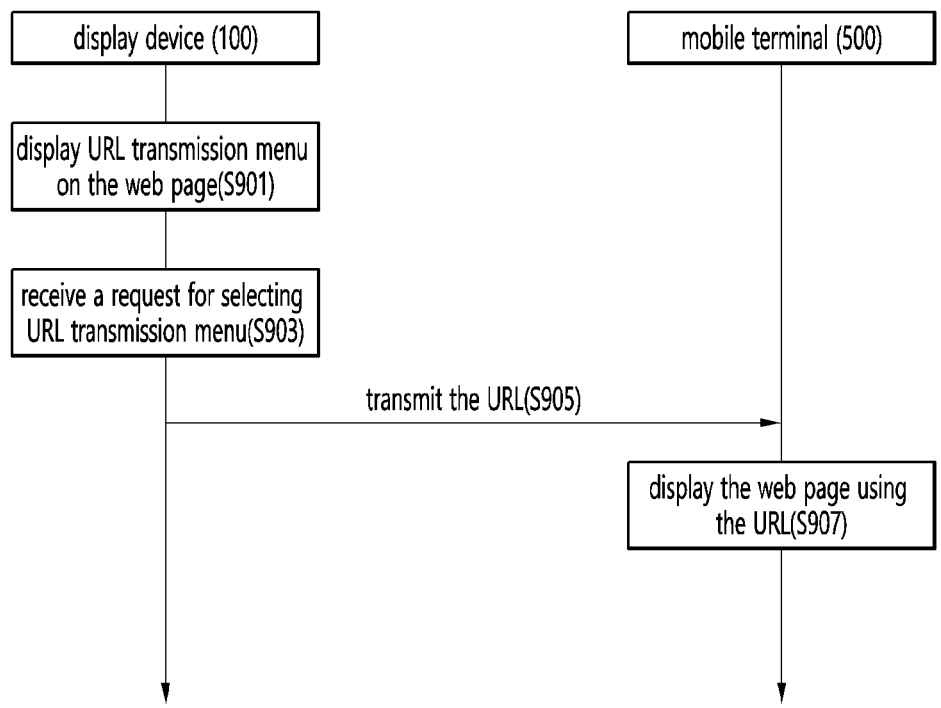
FIGS. 9 and 10 are diagrams illustrating a method of transmitting a URL of a web page to an external device and playing a video through the external device according to an embodiment of the present disclosure.
Figure 10:
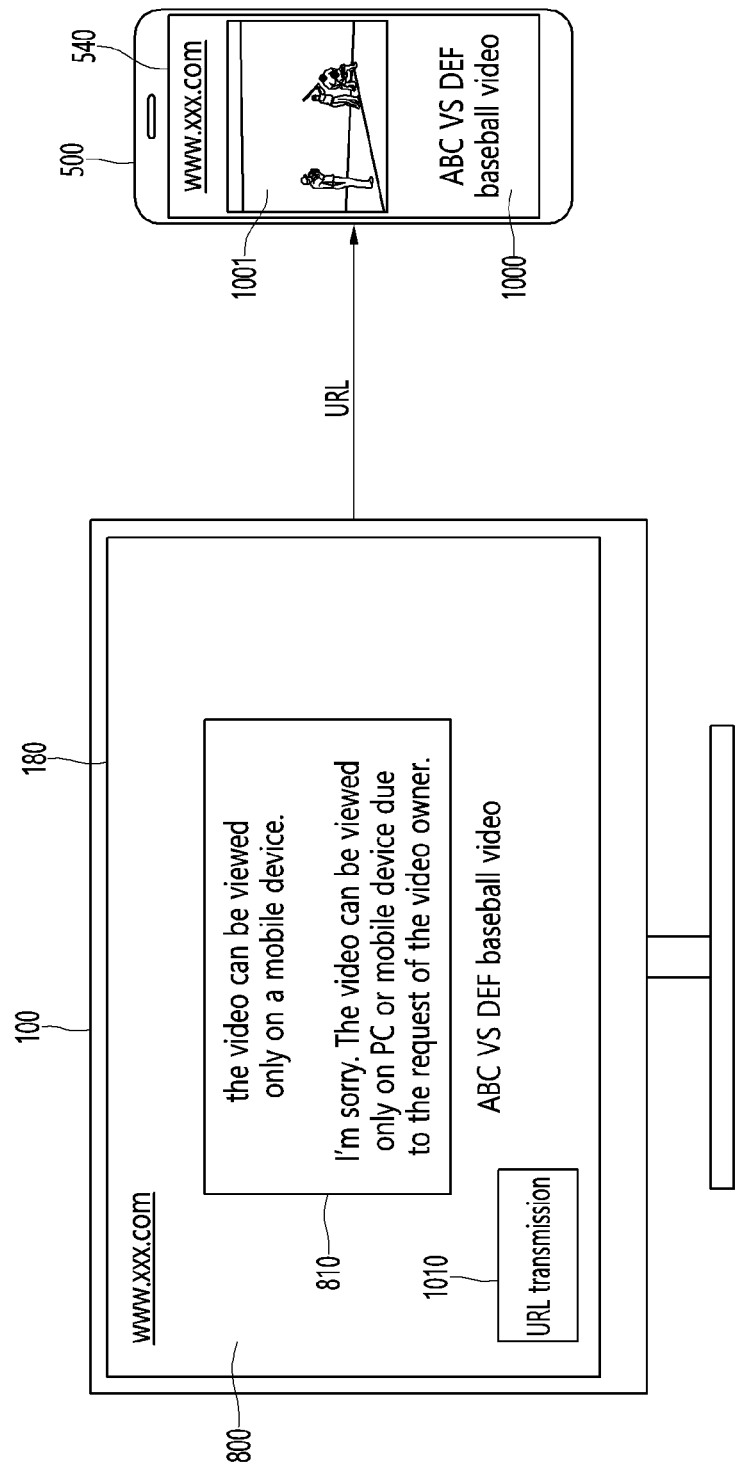

FIGS. 9 and 10 are diagrams illustrating a method of transmitting a URL of a web page to an external device and playing a video through the external device according to an embodiment of the present disclosure.

FIG. 9 is a diagram corresponding to step S709.

If the control unit 170 of the display device 100 determines that the video cannot be played according to the text recognition result, the control unit 170 displays a URL transmission menu on the web page (S901).

The URL transmission menu may be a menu for transmitting the URL of a web page displayed on the display device 100 to an external device connected to the display device 100.

Referring to FIG. 10, the display device 100 may display a URL transmission menu 1010 on a web page 800.

The URL transmission menu 1010 may be a menu that transmits the URL of the web page 800 being displayed by the display device 100 to an external device and allows the external device to access the web page through the transmitted URL.

The control unit 170 receives a request for selecting a URL transmission menu (S903) and transmits the URL to the mobile terminal 500 according to the received request (S905).

The display device 100 may obtain the URL of the web page 800 according to a request for selecting the URL transmission menu 1010 and transmit the acquired URL to the mobile terminal 500 through the wireless communication unit 173.

In another embodiment, if the URL transmission menu 1010 is selected, the control unit 170 may display a list including a plurality of external devices capable of receiving URL. In this case, the control unit 170 may transmit the URL to a selected external device among the plurality of external devices.

The control unit 170 may transmit a URL to an external device through a home appliance control application. The home appliance control application may be an application that controls home appliance interlocked through Internet Of Things (IoT).

Devices such as the display device 100 and the mobile terminal 500 may be a product already registered in the home appliance control application.

The display device 100 may transmit a URL to an external device registered in the home appliance control application.

The mobile terminal 500 accesses the web page corresponding to the URL using the received URL, and displays the web page (S907).

The web page displayed by the mobile terminal 500 may include a video play area. Since the mobile terminal 500 is a device for which reproduction of videos is not prohibited by policy, a video may be played on a web page displayed by the mobile terminal 500.

Referring to FIG. 10, the mobile terminal 500 may display a web page 1000 on the display 540 using the URL received from the display device 100.

On the web page 1000 displayed by the mobile terminal 500, a video 1001 that cannot be played by the display device 100 may be played.

In this way, the user can easily view a video that cannot be played on the web browser of the display device 100 through an external device connected to the display device 100.

Figure 11:
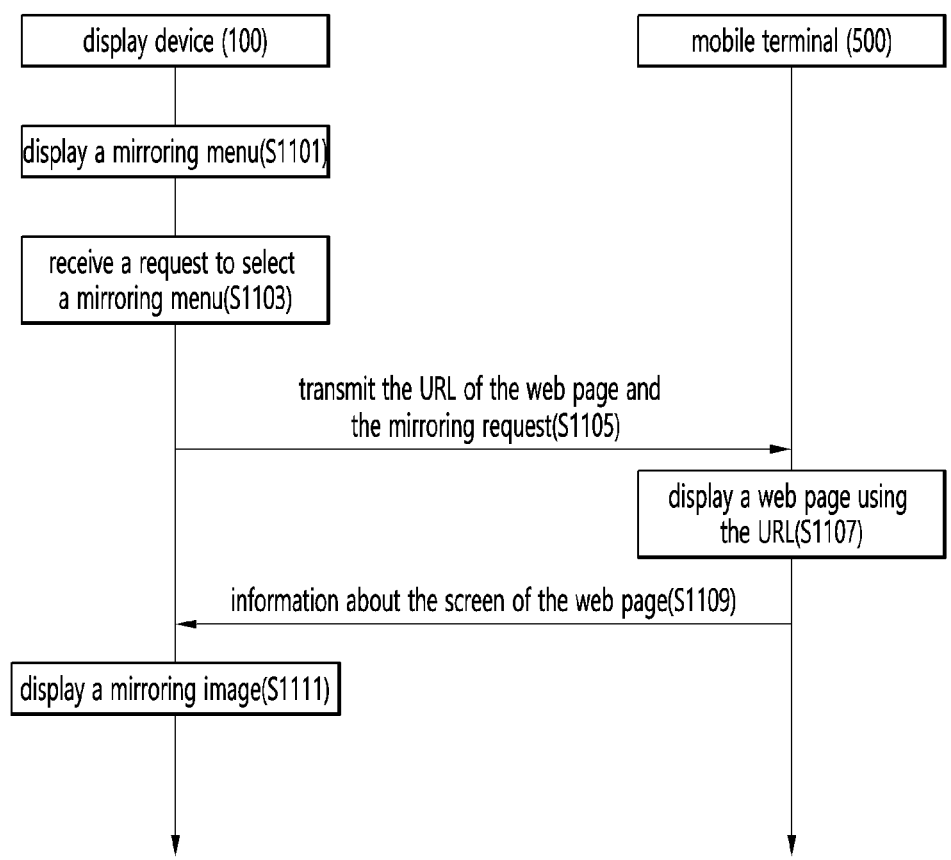
FIGS. 11 to 13 are diagrams illustrating a method of receiving a mirroring image from an external device and playing a video according to an embodiment of the present disclosure.
Figure 12:
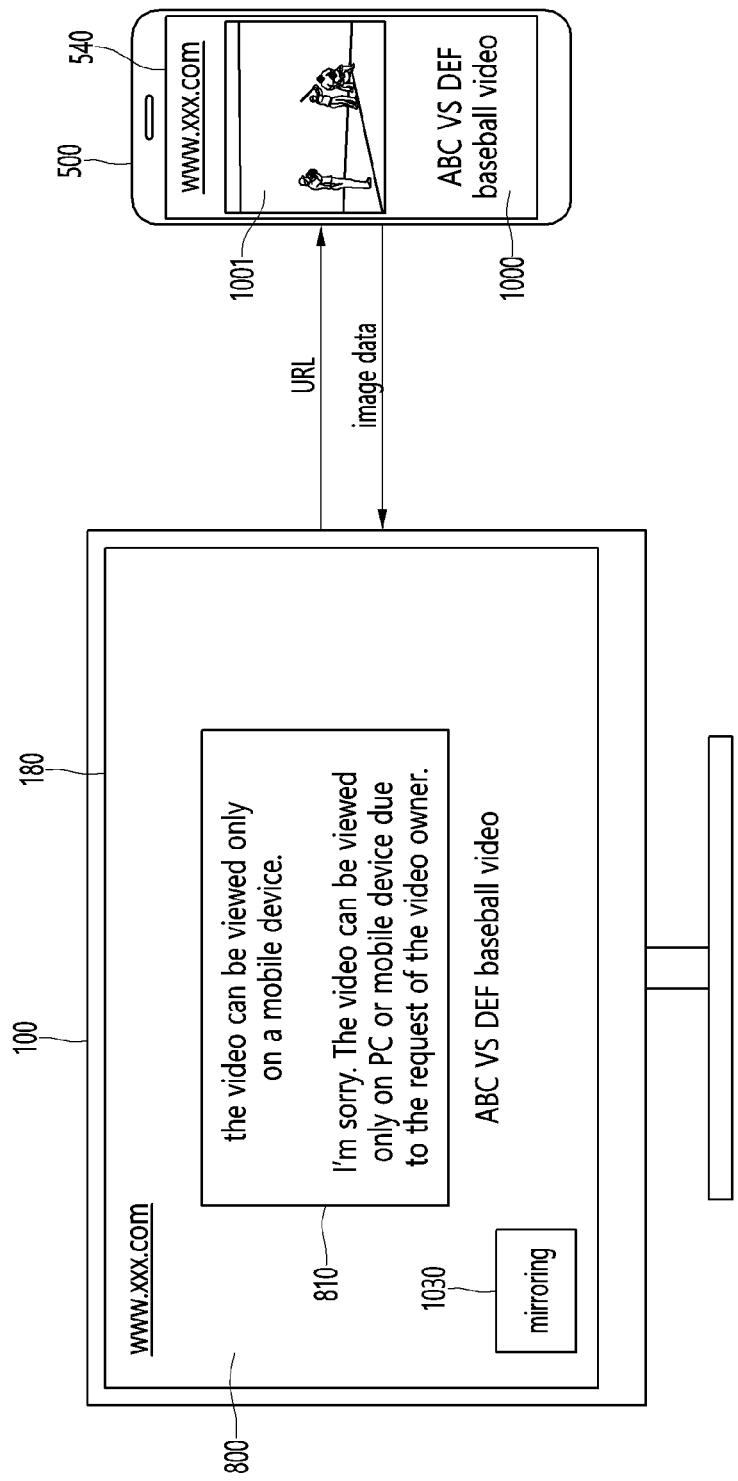
Figure 13:
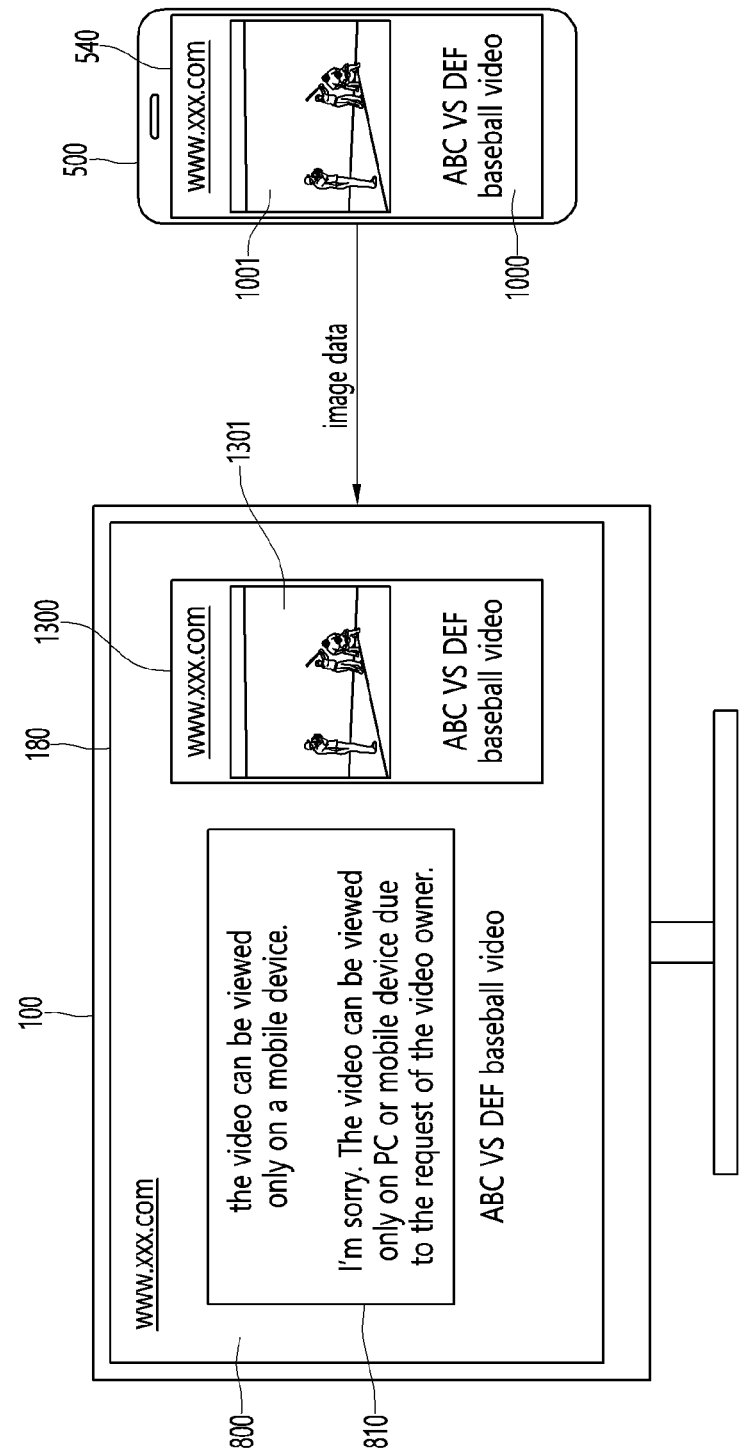

FIGS. 11 to 13 are diagrams illustrating a method of receiving a mirroring image from an external device and playing a video according to an embodiment of the present disclosure.

FIG. 11 is a diagram corresponding to step S709.

Referring to FIG. 11, the control unit 170 of the display device 100 displays a mirroring menu on a web page (S1101).

In one embodiment, the mirroring menu may be a menu for receiving and displaying an unplayable video from an external device on a web page of the display device 100.

As a result of text recognition, the mirroring menu may be displayed if it is determined that reproduction of the video is impossible.

The control unit 170 receives a request to select a mirroring menu (S1103), and transmits the URL of the web page and the mirroring request to the mobile terminal 500 according to the received request (S1105).

The mobile terminal 500 displays a web page using the URL received from the display device 100 (S1107).

The mobile terminal 500 transmits information about the screen of the web page being displayed to the display device 100 (S1109).

The mobile terminal 500 may transmit information including image data on the screen of the web page to the display device 100 in order to display the web page being displayed on the display device 100.

The display device 100 displays a mirroring image based on the received information (S1111).

The embodiment of FIG. 11 will be described in detail with reference to FIGS. 12 and 13.

Referring to FIG. 12, the display device 100 may display a mirroring menu 1030 if it is determined that it is impossible to play a video through the video play area 810 on the web page 800.

If the mirroring menu 1030 is selected, the display device 100 may transmit the URL of the web page 800 to the mobile terminal 500.

The mobile terminal 500 may access a web page using the URL received from the display device 100 and display the accessed web page 1000 on the display 540. On the web page 1000, a video 1001 that could not be played on the display device 100 may be played.

The mobile terminal 500 may transmit image data of the screen of the web page 1000 being displayed to the display device 100.

Referring to FIG. 13, the display device 100 displays, on the display unit 180, a mirroring image 1300 corresponding to the web page 1000 being displayed by the mobile terminal 500 based on image data received from the mobile terminal 500.

The mirroring image 1300 may include the same mirroring video 1301 as the video 1001 being played on the web page 1000 being displayed by the mobile terminal 500.

In this way, even if the video cannot be played through the web page of the display device 100, the user can watch the video using a screen sharing service with an external device.

Figure 14:
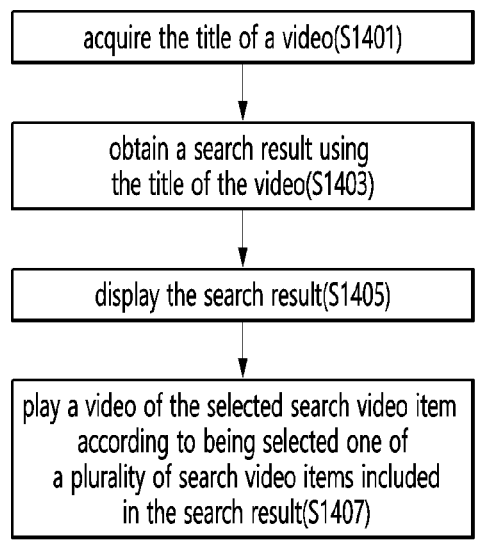
FIGS. 14 and 15 are diagrams for illustrating a method of searching for a title of a video and playing the video using the search result according to an embodiment of the present disclosure.
Figure 15:
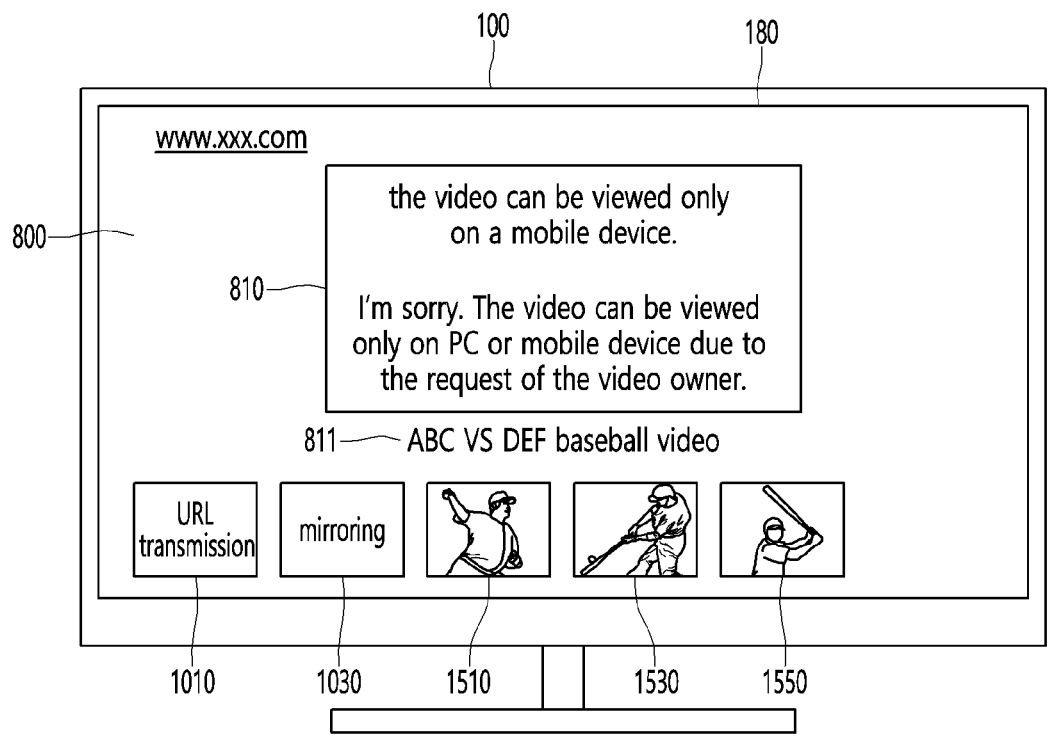

FIGS. 14 and 15 are diagrams for illustrating a method of searching for a title of a video and playing the video using the search result according to an embodiment of the present disclosure.

Referring to FIG. 14, the control unit 170 of the display device 100 acquires the title of a video that cannot be played on a web page (S1401).

The control unit 170 may extract the title of the video from the HTML document of the web page.

The control unit 170 searches for the title of the obtained video and obtains a search result including a plurality of search video items (S1403).

The control unit 170 may perform a search for the title of the extracted video. The control unit 170 may search for a video title through a preset search website.

The control unit 170 may transmit the title of the video to the search server and receive a search result for the title of the video from the search server.

The search result may include one or more search video items including title of the video.

As another example, a search result may include one or more video items having a name including a keyword of a video title.

The control unit 170 displays the obtained search result on the display unit 180 (S1405).

The control unit 170 may display the acquired search results on a web page.

The control unit 170 plays a video of the selected search video item as one of a plurality of search video items included in the search result is selected (S1407).

The control unit 170 may connect to a search server providing the selected search video item and play a video corresponding to the search video item.

Referring to FIG. 15, the display device 100 may acquire a title 811 of a video if it is determined that the video cannot be played based on the video play area 810 of the web page 800. The display device 100 may transmit the title 811 of the obtained video to a search server (not shown) and receive a search result from the search server.

The search result may include a plurality of search video items 1510, 1530, and 1550 having a title including the keyword of the title 811.

Each of the plurality of search video items 1510, 1530, and 1550 may be an item capable of reproducing a video.

That is, the display device 100 may acquire only playable videos, not unplayable video, according to policy or request of the right owner.

In this way, even if there is an unplayable video on the web page, the user can watch the same or similar video as the corresponding video, and can feel an improved experience.

Meanwhile, the display device 100 may further display a URL transmission menu 1010 and a mirroring menu 1030 on the web page 800 in addition to the plurality of search video items 1510, 1530, and 1550.

A user can watch an unplayable video in various ways through a plurality of search video items 1510, 1530, 1550, the URL transmission menu 1010, and the mirroring menu 1030, so that the range of video viewing option will be widened.

Figure 16:
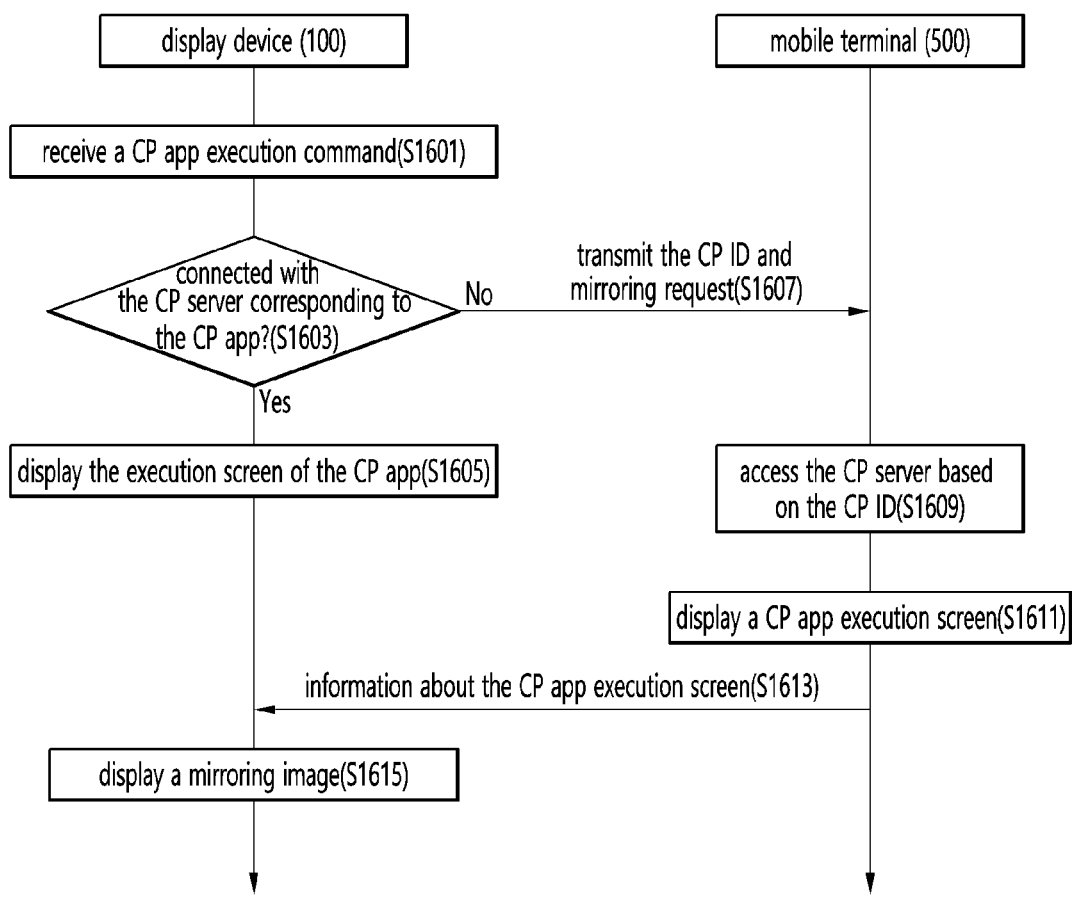
FIG. 16 is a ladder diagram illustrating an operating method of a display system according to an embodiment of the present disclosure.

FIG. 16 is a ladder diagram illustrating an operating method of a display system according to an embodiment of the present disclosure.

In particular, FIG. 16 is an embodiment of providing an interface for using a content provider through a mirroring function when a server of a content provider cannot be connected through the display device 100.

Referring to FIG. 16, the control unit 170 of the display device 100 receives a CP app execution command (S1601).

The control unit 170 of the display device 100 determines whether or not the connection to the CP server corresponding to the CP app is established according to the CP app execution command (S1603).

After receiving the CP app execution command, the control unit 170 may determine whether the CP server is accessed through the network interface unit 133 within a predetermined time. The control unit 170 may display a pop-up window indicating that the CP server is not connected if not connected to the CP server within the predetermined time.

When the CP server corresponding to the CP app is connected to the display device, the control unit 170 of the display device 100 displays the execution screen of the CP app on the display unit 180 (S1605).

If the control unit 170 of the display device 100 is not connected to the CP server corresponding to the CP app, the control unit 170 transmits the CP ID and mirroring request to the mobile terminal 500 (S1607).

The control unit 170 may transmit a CP ID capable of identifying a CP and a mirroring request for requesting mirroring of the CP app running screen of the mobile terminal 500 to the mobile terminal 500 through the wireless communication unit 173.

CP ID (Content Provider Identification) may be identification information for identifying a content provider or a CP app corresponding to the content provider.

The mobile terminal 500 accesses the CP server based on the received CP ID (S1609), and displays a CP app execution screen according to the access to the CP server (S1611).

The mobile terminal 500 may execute the CP app using the CP ID and access the CP server according to the execution of the CP app. Accordingly, the CP app execution screen may be displayed on the display 540 of the mobile terminal 500.

The control unit 170 of the display device 100 receives information about the CP app execution screen being displayed by the mobile terminal 500 (S1613), and displays a mirroring image based on the received information (S1615).

The control unit 170 may display a mirroring image corresponding to the CP app execution screen on the display unit 180 using image data of the CP app execution screen received from the mobile terminal 500.

Figure 17:
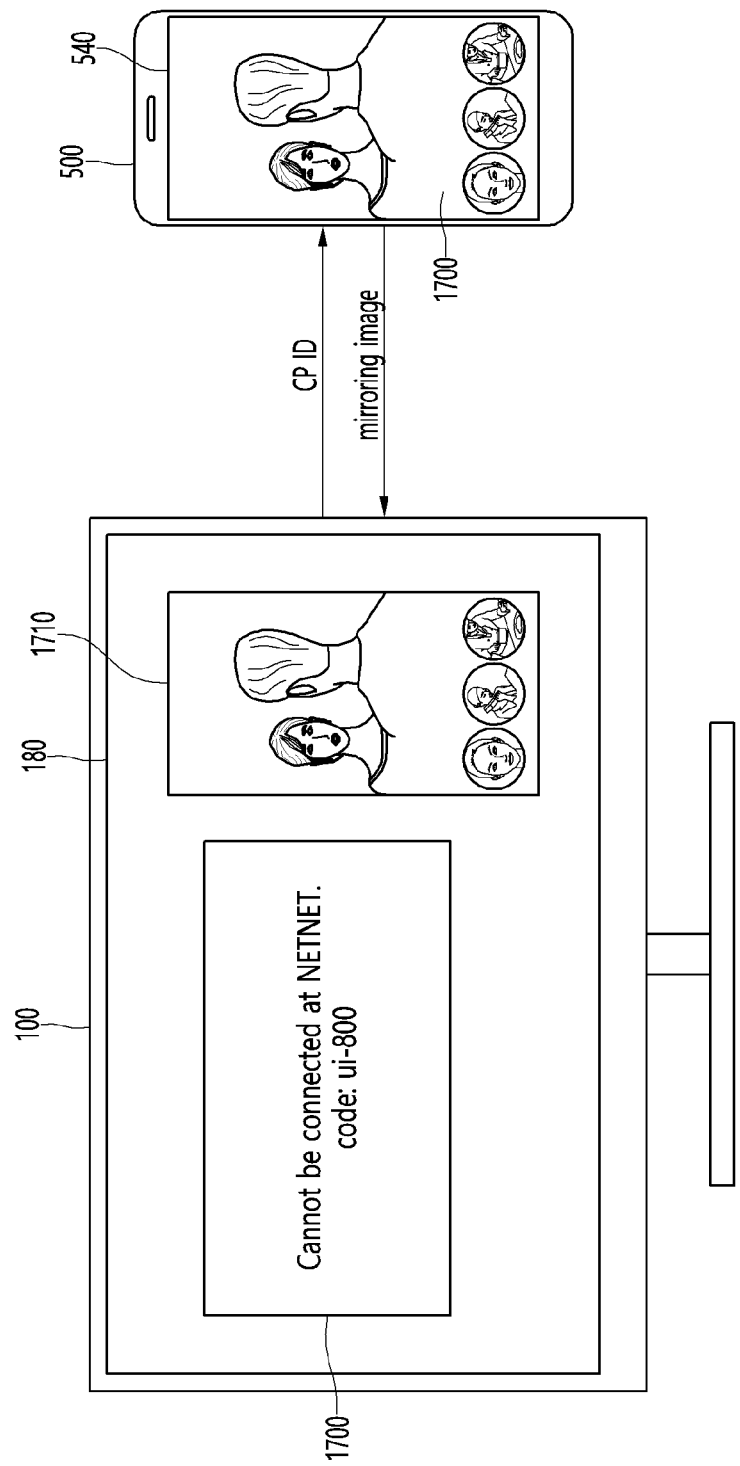
FIG. 17 is a diagram for illustrating an example of providing a CP app execution screen through a mirroring function with a mobile terminal when not connected to a CP server according to an embodiment of the present disclosure.

FIG. 17 is a diagram for illustrating an example of providing a CP app execution screen through a mirroring function with a mobile terminal when not connected to a CP server according to an embodiment of the present disclosure.

Referring to FIG. 17, after receiving the CP app execution command the display device 100 may display a pop-up window 1700 indicating that the CP cannot be connected if the display device 100 is not connected to the CP server.

After that, the display device 100 may transmit the CP ID and mirroring request to the mobile terminal 500.

The mobile terminal 500 may execute a CP app corresponding to the CP ID based on the received CP ID and display the execution screen 1700 of the CP app on the display 540.

The mobile terminal 500 may transmit image data for the CP app execution screen 1700 to the display device 100 for mirroring.

The display device 100 may display a mirroring image 1710 on the display unit 180 using image data of the CP app execution screen 1700 received from the mobile terminal 500.

In this way, according to an embodiment of the present disclosure, a content provider application that cannot be executed due to a connection error through the display device 100 can be used using an external device, so that user's inconvenience can be improved.

Figure 18:
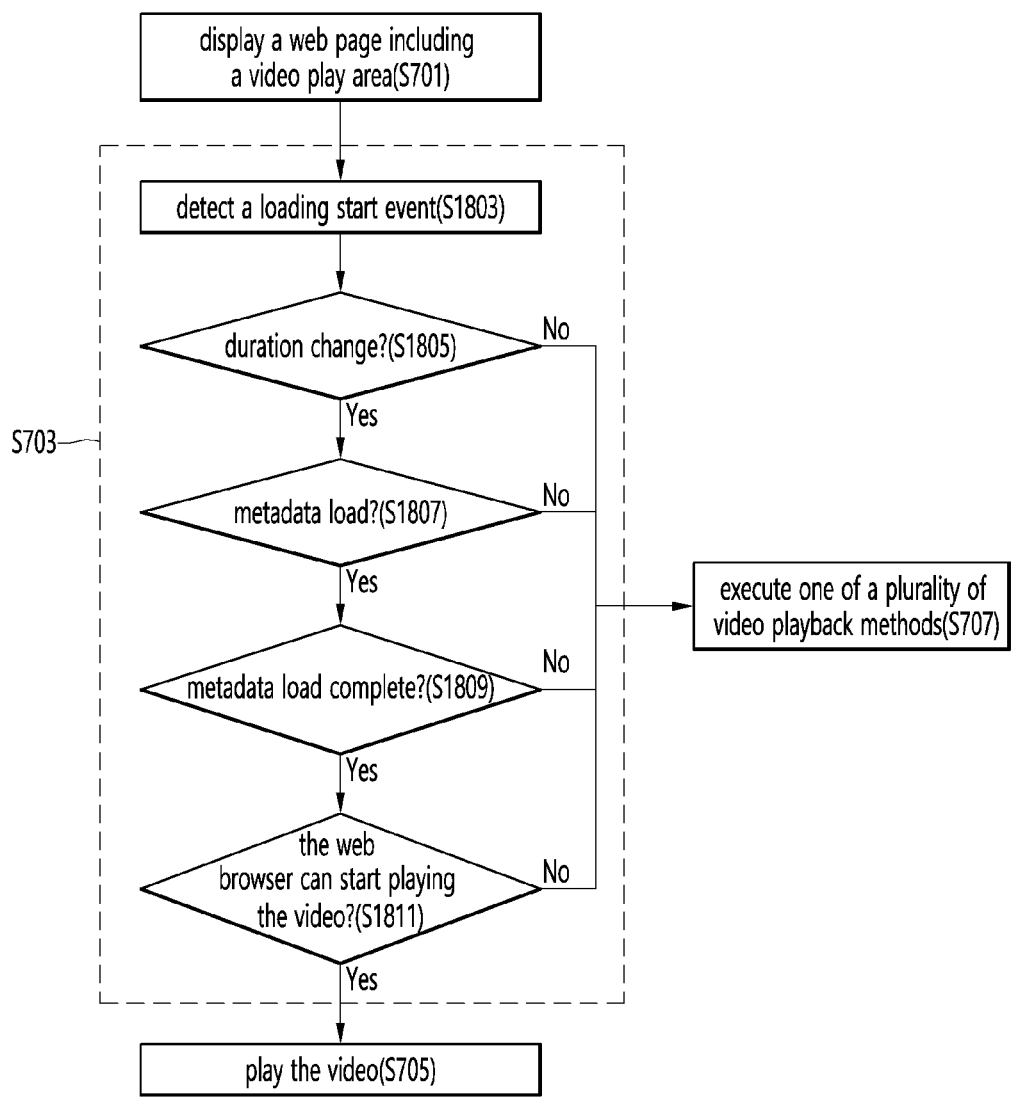
FIG. 18 is a flowchart illustrating a method of operating a display device according to another exemplary embodiment of the present disclosure.

FIG. 18 is a flowchart illustrating a method of operating a display device according to another exemplary embodiment of the present disclosure.

In particular, FIG. 18 is a diagram specifying the process of step S703 of determining whether a video can be played using the HTML event information of FIG. 7.

Referring to FIG. 18, the control unit 170 of the display device 100 displays a web page including a video play area on the display unit 180 (S701).

The control unit 170 of the display device 100 detects a loading start event of a video included in the web page (S1803).

The loading start event may be an HTML event generated if a web browser starts loading a video.

After that, the control unit 170 determines whether duration information of the video has been changed (S1805).

The control unit 170 may determine that the duration information of the video has changed if a duration change event occurring when the duration information of the video is changed is detected.

If the duration change event is not detected, the control unit 170 may perform step S707.

After that, the control unit 170 determines whether the metadata of the video is loaded (S1807).

The control unit 170 may determine that meta data is loaded if a loaded metadata event generated when meta data of a video is loaded is detected.

If the loaded metadata event is not detected, the control unit 170 may perform step S707.

After that, the control unit 170 determines whether the loading of the video is completed (S1809).

If the loading of the video is completed, the control unit 170 may determine that the loading of the video is completed if a loaded data event is detected.

The control unit 170 may perform step S707 when the loaded data event is not detected or when loading of the video is not completed.

After that, the control unit 170 determines whether the web browser can start playing the video (S1811).

The control unit 170 may determine that the web browser can start playing the video if a can play event that occurs when the web browser can start playing the video is detected.

If the can play event is not detected, the control unit 170 may perform step S707.

As such, according to an embodiment of the present disclosure, it may be determined whether or not the web browser can play a video using an HTML event.

According to an embodiment of the present disclosure, the above-described method can be implemented as a processor-readable code in a medium on which a program is recorded. Examples of media readable by the processor include ROM, RAM, CD-ROM, magnetic tape, floppy disk, and optical data storage devices, and those implemented in the form of carrier waves (for example, transmission through the Internet).

The display device described above is not limited to the configuration and method of the above-described embodiments, but the embodiments may be configured by selectively combining all or part of each embodiment so that various modifications can be made.

The invention claimed is:

1. A display device comprising:
a wireless transceiver configured to communicate with an external device, wirelessly;
a display; and
a controller configured to:
display, on the display, a web page including a video play area through a web browser,
determine whether a video can be played in the video play area, and
upon determining that the video cannot be played, display a mirroring menu on the web page of the display, transmit a Uniform Resource Locator (URL) of the web page to the external device through the wireless transceiver, and receive image data for a screen of the web page from the external device according to a command to select the mirroring menu.

2. The display device of claim 1, wherein the controller displays a URL menu for transmitting the URL to the external device on the display upon determining that the video cannot be played, and transmits the URL to the external device according to a command to select the URL menu.

3. The display device of claim 1, wherein the controller receives the image data for the screen of the web page from the external device, and displays a mirroring image of the web page on the display based on the received image data.

4. The display device of claim 1, wherein the controller is further configured to obtain a HTML (Hyper Text Markup Language) document corresponding to the web page, extract the video play area from within the HTML document, identify a text included in the extracted video play area, and determine whether the video can be played based on the text.

5. The display device of claim 1, wherein the controller transmits the URL to the external device which is registered in a home appliance control application, which is an application capable of controlling a home appliance through IoT.

6. The display device of claim 1, wherein the controller, searches video items related to the video using a title of the video upon determining that the video cannot be played and displays the searched video items on the display.

7. The display device of claim 4, wherein the controller recognizes a text output in the extracted video play area, and determines whether the video can be played according to a recognition result.

8. The display device of claim 1, wherein the controller detects an HTML (Hyper Text Markup Language) event of the web page and determines whether or not the video can be played according to a detection result of the HTML event.

9. The display device of claim 8, wherein the HTML (Hyper Text Markup Language) event is one of a duration event that occurs when duration information of the video is changed, a loaded metadata event that occurs when metadata of the video is loaded, a loaded data event that occurs when the video's loading is complete, and a can play event that occurs when the web browser starts playing the video, the controller determines that the video cannot be played if any one of the duration event, the loaded metadata event, the loaded data event, and the can play event is not detected.

10. The display device of claim 1, wherein the external device is a mobile terminal capable of performing a mirroring function with the display device.

11. An operating method of a display device, the method comprising:

displaying a web page including a video play area through a web browser;

determining whether a video can be played in the video play area; and upon determining that the video cannot be played, displaying a mirroring menu on the web page;

transmitting a URL (Uniform Resource Locator) of the web page to an external device and receiving image data for a screen of the web page from the external device according to a command to select the mirroring menu.

12. The method of claim 11, further comprising:

displaying a URL menu for transmitting the URL to the external device upon determining that the video cannot be played, wherein transmitting the URL comprises:

transmitting the URL to the external device according to a command to select the URL menu.

13. The method of claim 11, further comprising:

receiving image data for the screen of the web page from the external device; and displaying a mirroring image of the web page based on the received image data.

14. The method of claim 11, further comprising:

obtaining a HTML (Hyper Text Markup Language) document corresponding to the web page, extracting the video play area from within the HTML document, identifying a text included in the extracted video play area, and determining whether the video can be played based on the text.

15. The method of claim 11, further comprising:

searching for video items related to the video using a title of the video upon determining that the video cannot be played; and displaying the searched video items.

* * * * *